J. L. WOODBRIDGE.
DYNAMO ELECTRIC MACHINE.
APPLICATION FILED MAY 20, 1910. RENEWED JUNE 19, 1913.
1,084,723.
Patented Jan. 20, 1914.
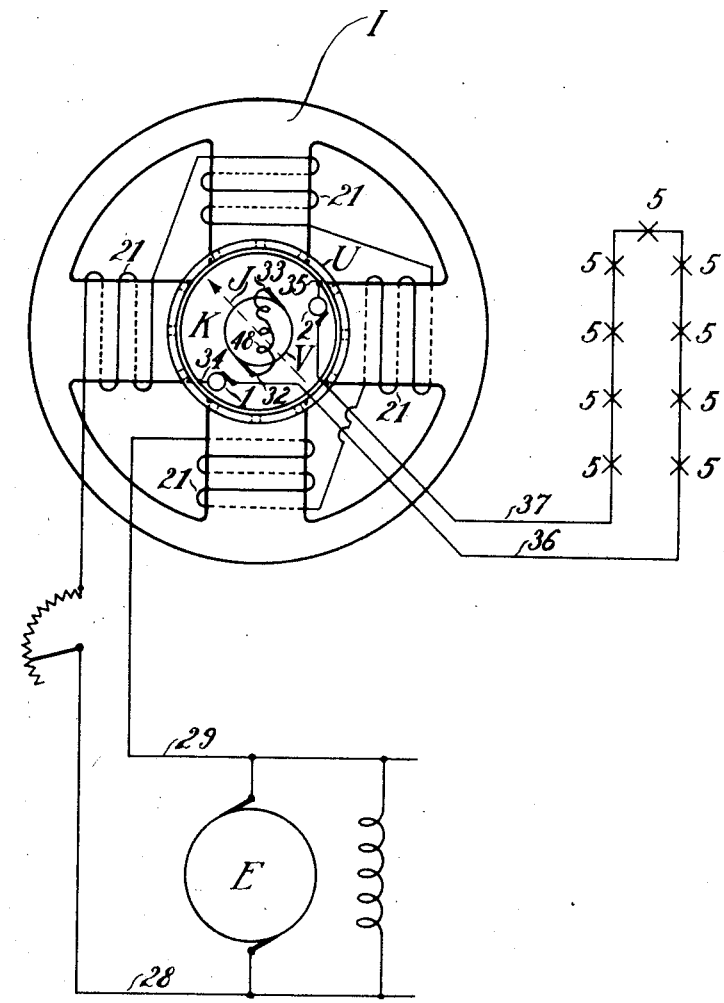

UNITED STATES PATENT OFFICE.

JOSEPH LESTER WOODBRIDGE, OF PHILADELPHIA, PENNSYLVANIA.

DYNAMO-ELECTRIC MACHINE.

1,084,723.  Specification of Letters Patent.  Patented Jan. 20, 1914.

Original application filed April 20, 1909, Serial No. 490,988. Divided and this application filed May 20, 1910, Serial No. 562,355. Renewed June 19, 1913. Serial No. 774,702.

*To all whom it may concern:*

Be it known that I, JOSEPH LESTER WOODBRIDGE, a citizen of the United States, and a resident of Philadelphia, in the county of Philadelphia and State of Pennsylvania, have invented certain new and useful Improvements in Dynamo-Electric Machines, of which the following is a specification.

My invention relates to dynamo electric machines of the alternating current type, and more particularly to constant current alternating current machines.

The object of my invention is to provide a dynamo electric machine designed to give a constant single phase current output, or, more broadly speaking, a single phase current output which will vary in proportion to the direct current excitation of the machine, and will be held constant so long as that excitation remains constant.

The general nature and characteristic features of the invention will be more clearly understood by reference to the following description taken in connection with the accompanying drawing in which—

I represents a dynamo electric machine built in accordance with my invention. It consists of a field frame designed in the usual manner with 4 internally projecting poles and a bi-polar wound armature K, and its commutator V. The armature is provided with single phase alternating current taps at points 34—35 which are connected respectively to collector rings shown conventionally in the drawing at 1 and 2. These collector rings would, of course, be mounted on the shaft in the usual manner. By means of these collector rings current is supplied to the circuit 36—37 which supplies a translating device such as arc lights 5. A field winding 21 is shown on the poles of this machine connected across the circuit 28—29 which is supplied with direct current by the exciter E. The winding 21 is so designed that the current transmitted through it from the circuit 28—29 will produce a bi-polar field in the direction of the arrow J. The brushes 32—33 bear upon the commutator V at points of maximum potential due to the field J, and these brushes are short-circuited by conductor 48. The flow of current through conductor 48 will produce a secondary field at right angles to J, and this field will produce the voltage necessary to transmit single phase current by way of conductors 36—37 to the translating device 5. This flow of current in the armature winding of the machine I will produce a single phase magneto-motive force in that armature, which may be divided into two components rotating about the armature in opposite directions. The rotation of the armature will hold one of these components stationary in space and the value of the single phase current output from the points 34—35 will be such that this stationary component of the magneto-motive-force will be sufficient nearly to counter-balance that of the field winding 21; leaving a residuum just sufficient to produce the flow of current across the brushes 32—33 necessary to maintain the required strength of secondary field above referred to. Owing to the low resistance of conductor 48 this residuum will be very small, and the flow of single phase current from the taps 34—35 will be practically proportional to the excitation produced by the field winding 21, and so long as this excitation is constant the output of single phase current from the points 34—35 to the circuit 36—37 will be constant. The second component of the single phase magneto-motive-force will by reason of the rotation of the armature be revolved in space at a speed double that of the armature rotation. In order to neutralize the effect of this component a stationary "squirrel cage" structure U is shown surrounding the armature in close proximity to its periphery. The method of constructing this "squirrel cage" is well known in the art, and need not be further described here. The currents induced in this "squirrel cage" as a result of the second component of the single phase magneto-motive-force will be such as to practically neutralize this component leaving merely the small residuum necessary to produce these currents. The machine I is therefore a dynamo designed to give a constant current single phase output, or broadly a single phase output proportional to its direct current field excitation.

This is a division of my application, Serial No. 490,988, filed April 20th, 1909.

Having described my invention what I claim as new and desire to secure by Letters Patent is—

1. In combination an armature and its commutator, a field structure in inductive relation thereto, appropriate field windings for the field structure adapted to produce a magnetic field through the armature, a set of brushes bearing upon the commutator at points of potential difference due to the field, a low resistance conducting circuit connecting said brushes, a single phase consumption circuit connected to the armature winding, and a conducting squirrel cage structure surrounding the armature close to its periphery.

2. In combination an armature and its commutator, a field structure adapted to provide a path for two sets of magnetic lines through the armature displaced from each other and constituting a primary and secondary magnetic field, windings on the field structure adapted to produce the primary field, interconnected brushes bearing on the commutator at points of potential difference due to the primary field and adapted to permit a flow of current in the armature to produce the secondary field, single phase terminals for the armature, a single phase consumption circuit connected thereto, and a conducting squirrel cage structure surrounding the armature close to its periphery.

3. In combination, in a dynamo electric machine, an armature, means for establishing a primary field there-through, means for deriving from said field and armature current for establishing in said armature a secondary field displaced from the first, connections for deriving single phase current from said armature, and a conducting circuit surrounding said armature and adapted to neutralize one component of the magneto-motive-force produced in the armature by said single phase current.

4. In combination, in a dynamo electric machine, an armature, means for establishing a primary field there-through, means for deriving from said field and armature current for establishing in said armature a secondary field displaced from the first, a single phase circuit connected to said armature, and a conducting circuit surrounding said armature and adapted to neutralize one component of the magneto-motive-force produced in the armature by a flow of single phase current therein.

5. In combination, in a dynamo electric machine, an armature and its commutator, means for establishing a primary field through said armature, means including a pair of brushes bearing upon the commutator and connected by an external circuit whereby a secondary field is produced through said armature displaced from the first, an alternating current circuit connected to said armature, and a conducting circuit surrounding said armature and adapted to neutralize one component of the magneto-motive-force produced in the armature by a flow of alternating current therein.

In testimony whereof I have hereunto signed my name.

JOSEPH LESTER WOODBRIDGE.

Witnesses:
R. A. WHETSTONE, Jr.,
CARROLL HODGE.